Patented Apr. 6, 1943

2,315,613

UNITED STATES PATENT OFFICE 2,315,613

POLY-HEXAHYDRO-HYDROQUINONE SEBACATE

Carl J. Frosch, Summit, N. J., assignor to Bell Telephone Laboratories, Incorporated, New York, N. Y., a corporation of New York No Drawing. Application November 22, 1940, Serial No. 366,719

7 Claims. (Cl. 260—75)

This invention relates to a new composition of matter and more particularly to a high molecular weight crystalline linear polyester having aliphatic rings in the molecular chain and possessing valuable properties. The polymer of the present invention may be advantageously employed in the manufacture of strong, pliable, elastic fibers, filaments, and threads and in fabrics prepared therefrom; in the formation of sheets; for coating purposes; as an impregnant for fibrous materials; in electrical insulation either in the form of a coating or as an impregnant; as well as for other purposes.

It has heretofore been proposed to produce high molecular weight linear polymers having molecules consisting of chains formed of hydrocarbon groups connected by various types of linkages, such as the ester and amide linkages, such polymers being of value for formation into fibers, filaments, threads, fabrics, coatings, etc. It has been recognized that a necessary characteristic of a polymer for such purposes is that upon solidification it have a crystalline structure, since a resinous polymer lacks the desired characteristics for such uses, particularly for formation into fibers, filaments, threads, or the like. It has been found that the presence of cyclic groups in the molecular chain tends to interfere with the crystallization of the polymer, and indeed may result in the production of a resin-like substance rather than a crystalline linear polymer. This has appeared to be especially true in the case of polyesters since the crystallizing forces present in ester linked molecules are relatively weak when compared to those present in amide linked molecules. Consequently, it has been generally believed heretofore that linear polymers containing cyclic groups in the chain would not crystallize unless amide linkages were present.

The present invention provides a composition of matter, poly-hexahydro-hydroquinone sebacate (poly 1,4 cyclohexandiol decandiotate) which contains regularly repeating identical hydrocarbon units, each of which includes an aliphatic ring, the hydrocarbon units being connected by ester linkages. Despite the fact that the substance contains alicyclic radicals and is a polyester, it crystallizes readily and may be formed into strong pliable fibers which upon being linearly stressed display fiber orientation with an attendant increase in desirable properties, such as tensile strength, elasticity, etc. Moreover, presumably due to the presence of the alicyclic radicals in the molecule, the polymer of the present invention is highly flexible in the solid state. It also possesses desirable electrical characteristics. These properties render the polymer very useful for numerous purposes, some of which will be indicated hereinafter.

The product of the present invention may be produced by condensing under polymerizing conditions hexahydro-hydroquinone, i. e., 1,4 dihydroxy-cyclohexane, with sebacic acid, i. e., decandioic acid. Heating suitable proportions of these two reactants at a suitable polymerizing temperature and for a suitable period of time under conditions such that the water which is formed during the condensation reaction is removed or rendered innocuous and such that access of oxygen to the reacting substances or the polymer is prevented results in condensation of the hexhydro-hydroquinone and the sebacic acid according to a reaction similar to if not identical with the following:

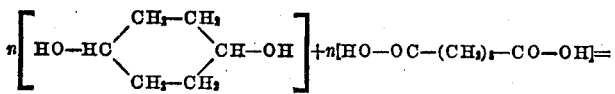

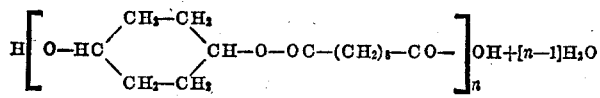

It is obvious that the units in the linear chain of molecule may be so arranged that the terminal groups may be both hydroxyl groups or both carboxyl groups, rather than as shown in the above reaction product, and that the polymerized substance will include molecules of all three types. It is also apparent that all molecules will have repeating groups of the kind indicated in the brackets in the reaction product indicated above.

In general, equal or approximately equal molar weight proportions of the reactants are heated in a suitable vessel, preferably closed, to a temperature of from about 100° C. to about 300° C. The lower limit on the temperature which may be employed is determined by the desirability that the temperature be above the boiling point of the water produced by the condensation reacation in order that the water be readily removed from the interior of the polymerized molten mass; the upper limit on the temperature which may be employed is determined by the possibility of damage to the polymer, which in turn is to a large extent determined by the thermo-stability of the chemical bonds between the atoms of the polymer. Temperatures of from about 200° C. to about 250° C. are preferred. Several hours are required in order to achieve the desired degree of condensation, which is indicated by the molecular weight of the polymer.

In order to agitate the mass, facilitate the removal of water therefrom, and to further the reaction by providing large contacting surfaces of the reacting substances, it is desirable to bubble through the mass a gas, such as nitrogen or hydrogen, which is inert to the reacting substances and to the polymer. The gas should be free of oxygen in order to eliminate the possibility of oxidation of the reactants or the reaction product, with deleterious effects thereto.

In general for coating, fiber-or thread-forming purposes, as well as for most other uses, a molecular weight of the polymer of over 7000, and ranging as high as 20,000 or more, is desirable, although somewhat lower molecular weights may in certain cases be employed for other purposes, such as molding purposes. A rough but effective test indicating when the polymer is ready for formation into fibers may be obtained by contacting the molten mass with a rod, which is then drawn away. The formation of a continuous strong, pliable filament which can be oriented indicates that the fiber forming stage has been reached.

However, a more accurate method of determining whether the polymer is ready for use can be obtained by determination of the viscosity of the polymer. If the polymer has an intrinsic viscosity of at least about .5 as measured according to a system outlined below it may be readily drawn into fibers. To obtain the intrinsic viscosity, some of the polymer is dissolved in a suitable solvent, such as chloroform, and the time required for a given quantity of it to flow through a given viscosimeter is measured. Usually 5 cc. of a 1 per cent solution of the polymer is caused to flow through a viscosimeter rated at approximately 100 seconds for the same volume of water at 20° C. The time required for an identical volume of the solvent at the same temperature to pass through the same viscosimeter is also determined. The intrinsic viscosity is then calculated from the following equation:

melts sharply at about 85° C. to a viscous liquid showing a slight bluish fluorescence.

In the solid state the material is very tough and flexible and may be used to form sheets, as an artificial leather or as an impregnant for textile materials. The substance in the solid state has a dielectric constant of about 4, a power factor of .5 per cent at $10^6$ cycles and water absorption of .4%. These desirable electrical characteristics and its toughness and flexibility in the solid state render the polymer of the present invention very useful as an impregnant for textile electrical insulation or for coating wires for insulating purposes.

Strong pliable fibers or filaments may be formed of the polymer of the present invention by dissolving it in a suitable solvent and extruding the solution into a liquid or atmosphere which extracts the solvent from the polymer; or by extruding the molten polymer directly into the air in which it solidifies upon cooling. The latter procedure is preferable.

The polyester of the present invention, particularly when in sheet, filament, or fiber form, exhibits a very high degree of permanent orientation when stressed. Thus, when a fiber of the polymer of the present invention is stressed at normal temperatures, i. e., "cold drawn," a reduction in the cross-section and a corresponding increase in the length of the fiber occurs, the magnitude of which is dependent upon the stretch to which the fiber is subjected. When cold drawn fibers of the polymer of the present invention are examined by X-rays they furnish a sharp diffraction fiber pattern and also exhibit birefringence and parallel extinction when observed under crossed Nicol prisms, which indicate crystal orientation along the fiber axis. The fiber permanently remains in such oriented elongated state, and in such form has considerably more strength and elasticity than it had prior to the cold drawing operation. Similar beneficial orientation may occur when the polyester of the present invention is employed as a coating or as an impregnant, since scuffing or abrasion to which the polymer may be subjected in use may impart to it a stress which results in the desired beneficial orientation.

Fibers, filaments or threads of the polymer of the present invention may be advantageously employed in various manners. Thus, fibers, filaments, or threads as such may be employed for electrical insulation purposes, or may be formed $$\text{Intrinsic viscosity} = \frac{\frac{\text{time for solution to pass through viscosimeter (seconds)}}{\text{time for solvent to pass through viscosimeter (seconds)}} - 1}{\text{weight of polymer per 100 cc. of solution}}$$

All measurements are made at the same temperature, which should be low enough to prevent evaporation of the solvent. Room temperature is usually satisfactory.

The following specific example of the invention is given for the purposes of illustration: Molar proportions of hexahydro-hydroquinone and sebacic acid are heated at a temperature of about 200° C., oxygen-free hydrogen gas being bubbled through the molten mass. The heating is conducted until the intrinsic viscosity in chloroform exceeds .5, measured according to the method indicated above, about 48 hours of heating being required. The molten polymer solidifies readily into a micro-crystalline product as shown by a sharp X-ray crystalline pattern, which solid into fabrics for use in garments or for other purposes.

It is apparent that the above-discussed method of producing the polymer of the invention is illustrative and that other modes of producing it and other modifications may be made in the method indicated above without departing from the spirit of the invention. It is intended that the patent shall cover in the appended claims whatever features of novelty reside in the invention.

What is claimed is:

1. Hexahydro-hydroquinone sebacate polymerized to a degree such that it possesses an intrinsic viscosity in chloroform of at least about .5.

2. A hexahydro-hydroquinone sebacate polymer having a molecular weight of at least about 7000.

3. A linear condensation polymer of microcrystalline structure in the solid state the molecules of which are essentially formed of repeating groups of the formula:

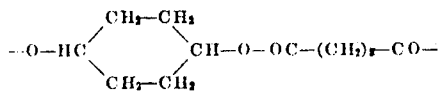

and having an intrinsic viscosity in chloroform of at least about .5.

4. The process of producing a high molecular weight linear polymer which is micro-crystalline in the solid state and has repeating groups, each of which includes an alicyclic radical, separated by ester linkages, comprising heating in the absence of oxygen at a polymer forming temperature polymer-forming reactants comprising essentially hexahydro-hydroquinone and sebacic acid, and continuing such heating until a polymer is formed having a molecular weight of at least about 7000.

5. The process of porducing a high molecular weight linear polymer which is micro-crystalline in the solid state and has repeating groups, each of which includes an alicyclic radical, separated by ester linkages, comprising heating in the absence of oxygen at a polymer forming temperature polymer-forming reactants comprising essentially hexahydro-hydroquinone and sebacic acid, and continuing such heating until a polymer is formed having an intrinsic viscosity in chloroform of at least about .5.

6. The process of producing a high molecular weight linear polymer which is micro-crystalline in the solid state and has repeating groups, each of which includes an alicyclic radical, separated by ester linkages comprising heating in the absence of oxygen at a polymer forming temperature polymer-forming reactants comprising essentially hexahydro-hydroquinone and sebacic acid, and continuing such heating until a polymer is formed which is capable of being drawn into strong, pliable fibers showing crystal orientation along the fiber axis.

7. Polymerized hexahydro-hydroquinone sebacate having a molecular weight great enough to render it capable of being drawn into strong, pliable fibers which show crystal orientation along the fiber axis.

CARL J. FROSCH.